3,111,529
PROCESS FOR THE MANUFACTURE OF
4-METHYL-6-ISOBUTENYL-PYRONE-(2)
Gerhard Lohaus and Claus Beermann, Frankfurt am Main, Germany, assignors to Farbwerke Hoechst Aktiengesellschaft vormals Meister Lucius & Brüning, Frankfurt am Main, Germany, a corporation of Germany
No Drawing. Filed May 8, 1962, Ser. No. 193,333
Claims priority, application Germany May 12, 1961
2 Claims. (Cl. 260—343.5)

The present invention relates to 4-methyl-6-isobutenyl-pyrone-(2) and to a process for its manufacture, which comprises dissolving $\beta,\beta$-dimethylacrylic acid or a compound which under the reaction conditions can be converted into $\beta,\beta$-dimethylacrylic acid in polyphosphoric acid, and heating the mixture at a temperature within the range of 20 to 150° C., preferably 50 to 100° C.

Compounds which under the reaction conditions can be converted into dimethylacrylic acid are, for example, $\beta$-methylene-butyric acid, $\beta,\beta$-dimethylpropiolactone and esters of dimethyl-acrylic acid and $\beta$-methylene-butyric acid. Among these compounds, the $\beta,\beta$-dimethylpropiolactone can be easily prepared from acetone and ketene and can be isomerized, for example, thermally and preferably in the presence of acid catalysts, to obtain dimethylacrylic acid or methylene-butyric acid (cf. Beilstein, volume 2, 3rd suppl., pages 1305 and 1312).

The condensation reaction is carried out at a temperature within the range of 20° C. to 150° C., preferably 50° C. to 100° C. It is suitable to dissolve the $\beta,\beta$-dimethylacrylic in the polyphosphoric acid at room temperature or a slightly elevated temperature only, and, in order to complete the reaction, to start heating to a higher temperature, for example 80° C., after about 24 to 48 hours only. The phosphorus pentoxide content of the polyphosphoric acid shall preferably be within the range of about 80 to 85% by weight. For 1 part by weight of dimethylacrylic acid or 1 part by weight of a corresponding compound which can be converted into dimethylacrylic acid, there are suitably used between 4 and 30 parts by weight of the condensing agent. After completion of the reaction, the product is still dissolved in the polyphosphoric acid and can be precipitated by the addition of water or ice and separated by suction-filtration or shaking with an appropriate organic solvent. The further purification is advantageously carried out by distillation under reduced pressure and recrystallization.

The present process is new and interesting from the chemical point of view. According to the state of the art, addition reactions with dimethylacrylic acid only have been carried out by adding for example amines or mercaptans on its double bond so that saturated compounds are formed. No reactions, however, are hitherto known in which the dimethylacrylic acid is subjected to a self-condensation. Moreover, it is surprising, that by the present process the double bonds of the dimethylacrylic acid do not react. Thereby, no addition or polymerization takes place as could have been expected by the analogy of the $\beta$-monomethylacrylic acid, but a novel unsaturated compound is formed which possesses valuable chemical properties.

The 4-methyl-6-isobutenyl-pyrone-(2) prepared by the process of the present invention has bactericidal and fungicidal properties. Moreover, it is a novel and interesting intermediary product, especially for syntheses in the carotene and vitamin A series. Furthermore, it can be used as intermediary product for the preparation of pesticides. So, for example, the perchlorination product of the 4-methyl-6-isobutenyl-pyrone-(2), which can be obtained by treating this compound with chlorine, has insecticidal activity.

The following examples serve to illustrate the invention, but they are not intended to limit it thereto:

*Example 1*

250 grams of pulverized $\beta,\beta$-dimethylacrylic acid were dissolved in 1300 grams of polyphosphoric acid within 8 hours at about 50° C. The following day, the batch was heated for 2 hours at 80° C., poured onto ice and the condensation product formed was extracted with methylene chloride. By distillation under a reduced pressure of 2 mm. Hg, 102 grams of 4-methyl-6-isobutenyl-pyrone-(2) were obtained having a boiling point within the range of 120° C. to 125° C. After recrystallization from a mixture of carbon tetrachloride and petroleum ether, the product of the invention melted at a temperature within the range of 48° to 49° C.

*Example 2*

100 grams of $\beta,\beta$-dimethylacrylic acid were dissolved in 600 grams of polyphosphoric acid at room temperature and the batch was allowed to stand for 12 days. After having worked up the batch as described in Example 1, 24 grams of 4-methyl-6-isobutenyl-pyrone-(2) were obtained.

*Example 3*

250 grams of $\beta$-methylene-butyric acid were poured into 1300 grams of polyphosphoric acid while stirring within 4 hours at room temperature. The batch was allowed to stand over-night and heated the next day for 2 hours at 80° C. In order to avoid an excessive foaming, the batch must not be heated too rapidly. The reaction being complete, the reaction mixture was poured onto ice, the precipitate was filtered off with suction and dried under reduced pressure. There were obtained 112 grams of 4-methyl-6-isobutenyl-pyrone-(2) which could be purified by distillation under reduced pressure or recrystallization.

*Example 4*

150 grams of dimethylacrylic acid ester were stirred into 700 grams of polyphosphoric acid and the mixture was then heated for 6 hours at 80° C. The batch was then poured onto ice, the pyrone was extracted by means of methylene chloride and isolated by distillation under reduced pressure. There were obtained 58 grams of 4-methyl-6-isobutenyl-pyrone-(2) which corresponded to 60% of the theoretical.

*Example 5*

200 grams of $\beta,\beta$-dimethyl-propiolactone were stirred within 3 hours into 1100 grams of polyphosphoric acid while cooling with water. The batch was allowed to stand for 24 hours at room temperature and then heated for 4 hours at 90° C. After working up in the usual manner, 65 grams of pure 4-methyl-6-isobutenyl-pyrone-(2) were obtained.

We claim:
1. A process for the manufacture of 4-methyl-6-isobutenyl-pyrone-(2), which comprises heating a member selected from the group consisting of β,β-dimethylacrylic acid, β-methylene butyric acid, β,β-dimethyl propiolactone, β,β-dimethyl acrylic acid ester and β-methylene butyric acid ester in polyphosphoric acid to a temperature from 20° C. to 150° C.

2. Process as defined in claim 1 wherein the heating is carried out at a temperature between 50° C. and 100° C.

References Cited in the file of this patent

Wiley et al.: J. Org. Chem., volume 22 (1957), pages 1737 and 1738.